United States Patent [19]

White

[11] 4,093,572

[45] June 6, 1978

[54] METHOD OF MAKING A STORAGE STABLE ISOCYANATE AND ITS USE

[75] Inventor: John R. White, Wadsworth, Ohio

[73] Assignee: The Goodyear Tire & Rubber Company, Akron, Ohio

[21] Appl. No.: 729,319

[22] Filed: Oct. 4, 1976

[51] Int. Cl.$^2$ ............................................. C08G 18/14
[52] U.S. Cl. ........................ 260/2.5 AH; 260/46.5 R; 260/453 SP
[58] Field of Search ................... 260/453 SP, 2.5 AH, 260/46.5 R

[56] References Cited

U.S. PATENT DOCUMENTS

| | | | |
|---|---|---|---|
| 2,834,748 | 5/1958 | Bailey et al. | 260/46.5 R |
| 3,285,866 | 11/1966 | Gmitter | 260/2.5 AF |
| 3,457,200 | 7/1969 | Critchfield et al. | 260/2.5 AT |

*Primary Examiner*—M. J. Welsh
*Attorney, Agent, or Firm*—J. D. Wolfe

[57] ABSTRACT

Addition of 0.2 to 0.4 parts of a liquid block copolymer silicone to 100 parts of an organic isocyanate to lower the surface tension of the resulting composition to less than 40 dynes/centimeter to obtain an isocyanate composition that has long room storage stability without crystallization and when used in an impingement type mixture produces polyurethane of a more uniform composition.

5 Claims, No Drawings

METHOD OF MAKING A STORAGE STABLE ISOCYANATE AND ITS USE

This invention relates to a storage stable isocyanate composition and to an improved polyurethane product made utilizing the improved storage stable isocyanate composition.

Isocyanate compositions have been widely used for a number or years in making polyurethane compositions by reaction with reactive hydrogen containing materials such as polyether polyols or polyester polyols to give compositions which have many uses and particularly for making foam or microcellular products when foaming additives are present. These foams or microcellular products are useful as protective coatings, decorative materials and even in making tires.

In the making of polyurethane compositions there have been essentially two type mixing apparatuses used, the so-called mechanical mixers and the impingement mixers. Essentially, where the mechanical mixers or mixing apparatus is used, it is a low pressure operation, while the impingement mixers utilize high pressures, in the range of about 1000 pounds per square inch or higher, normally 2000 to 3000 psi is used in commercial practice. The impingement mixer utilizes the high pressure to inject streams of isocyanate composition into a reactive hydrogen containing composition to obtain mixing. The impingement type mixers have certain advantages, namely they can be made of the self-cleaning type whereas the mechanical mixers have to be flushed with solvent to keep the mixer from becoming plugged with polyurethane compositions. One of the drawbacks of the impingement type mixers is that the quality of the mixing of the polyurethane ingredients is not consistent and appreciable variations in physical compositions of the urethane is observed in plant runs.

In recent years the commercial practice has developed of using modified isocyanate compositions rather than the organic isocyanate per se. For instance, the isocyanate may be reacted with a low or high molecular weight polyol, usually less than 1000 molecular weight are preferred and still more preferred are those less than 300 molecular weight, to form a quasi prepolymer as described in U.S. Pat. No. 3,457,200. The quasi-prepolymer is utilized in making the polyurethanes because it generally gives a polyurethane having superior physical properties over that obtained when using the organic polyisocyanate per se, such as toluene diisocyanate, or other polyisocyanates. Another reason for utilizing the so-called quasi prepolymer isocyanates is that they tend to be liquids at temperatures above about 25° to 30° C. whereas the pure isocyanates such as diphenyl methane-4,4'-diisocyanate, or MDI is a solid. Also, recently MDI of a liquid type has come on the market, this being essentially a mixture of isomers, cis-cis and trans-trans isomers of MDI which yield a liquid usually at about 30° C.

On long standing at temperatures near the crystallization point of these quasi prepolymers or liquid organic polyisocyanates of mixed isomeric type, difficulty has been experienced with the formation of crystals and the isocyanate composition becoming nonuniform in isocyanate content or isomer content. Therefore, it has been the practice to hold these isocyanate compositions at relatively high temperatures for an appreciable time before they are utilized and to thoroughly mix the material at the time it is to be used.

I have discovered that the above difficulties experienced with isocyanate compositions that tend to crystallize and become nonuniform on standing at temperatures approaching the crystallization temperature can be alleviated or prevented by adding at least 0.25 and preferably about 0.4 parts by weight or higher of a specific organic high functional silicone and when these specific organic high functional silicones containing isocyanate compositions, viz. sometimes hereinafter called low surface tension mixtures are utilized to make polyurethane composition in a high pressure impingement mixer, the resulting polyurethanes are characterized by having improved physical properties. For instance, when cellular polyurethanes are produced, the size of the cells is dramatically reduced and the cell size distribution is more nearly uniform with essentially no very large cells relative to the small cells. Consequently, the urethane foam products produced utilizing isocyanate compositions containing intimately mixed therein high organic functional content silicones have more uniform physical properties such as tensile, elongation and tear are higher than where the isocyanate composition does not contain the high organic functional silicones at the time the isocyanate composition is mixed with the polyol.

The benefit of this invention is obtained by mixing the high organic functional silicone in the isocyanate composition appreciably before it is used, but this improvement in physical properties can be obtained even when the high organic functional silicone is added to the isocyanate composition immediately prior to the time the isocyanate composition is mixed with the reactive hydrogen containing material, viz. the polyol of 500 to 7000 and preferably 1000 to 6000 molecular weight.

The specific organic high functional silicones useful in this invention to stabilize the isocyanate compositions and to produce improved polyurethanes from said isocyanate composition are the silicone block polymers of polysiloxane-polyoxyalkylene or the block polymers, such as those shown in U.S. Pat. No. 2,834,748, Bailey et al., dated May 13, 1958, entitled "Siloxane-Oxyalkylene Block Copolymers", where the copolymer units are ethylene and propylene radicals, or U.S. Pat. No. 3,285,866. These silicones can have ABA type blocks composed of ethylene and propylene and generally are hydrolyzible in nature. Also, there are non-hydrolyzible copolymer block silicones of the rake structure with the copolymer blocks being ethylene propylene radicals.

The useful silicone block polymers of this invention are capable of lowering the surface tension of the isocyanate composition, as measured by Cenco-DuNony Interfacial Tensiometer to less than 40 and preferably less than 35 dynes/centimeter when measured at 25° C. Also, the useful silicone block polymers when added to an intimately mixed with the organic isocyanate composition should produce a uniform film across the surface tension ring as the ring breaks from the surface of the organic isocyanate composition. The silicones that are not useful in this invention do not reduce the surface tension to less than 40 dynes/centimeter at 25° C. on a mixture of 0.5 part by weight of the silicone per 100 parts by weight of the isocyanate composition and also, it was observed that drops formed on the surface tension ring instead of forming a continuous film. Furthermore, some of the unsatisfactory silicones caused the isocyanate composition to gel upon standing.

The nature of this invention can more readily be appreciated from the following representative examples, where all parts and percentages are by weight unless otherwise indicated.

Equivalent amounts of various commercial isocyanate compositions were mixed with varying amounts of different silicones and placed in 4-ounce bottles and let stand and part of each sample was used to measure its surface tension. The results of these tests are reported in Table 1.

Table 1
EFFECT OF 0.5 PARTS SILICONE ON SURFACE TENSION OF 100 PARTS OF ISOCYANATE

| Isocyanates | Type Silicone | Surface Tension | Comments[1] |
|---|---|---|---|
| Isonate 226[2] | Y6691[3] | 30.5 | Form film across ring |
| " | L5303[3] | 36 | " |
| " | L520[4] | 33 | Isocyanate gelled in 1 day at 1.0 pbw |
| " | DC 190[5] | 29 | Forms film |
| " | DC 198[5] | 28 | " |
| " | DC 200[6] 50 cks | 32 | Does not form film |
| Mondur PF[7] | Y6691 | 34 | Forms film |
| D824[8] | Y6691 | 32 | " |
| PAPI[9] | Y6691 | 30 | " |
| PAPI 901[9] | Y6691 | 39 | No film |

[1]The ring referred to in the comments is the interfacial tensiometer ring used for the surface tension measurements.
[2]Isonate 226, a trade designation of a product of The Upjohn Company, is a quasi-prepolymer of flaked MDI and a polyester of approximately 1000 molecular weight containing 18.6% free NCO.
[3]Y6691 and L5303, trade designations of a product of The Union Carbide Company, are block copolymer silicones.
[4]L520, a trade designation of a product of the Union Carbide Company for a silicone block copolymer of ethylene propylene.
[5]DC190 and DC198, trade designations of products of The Dow Corning Company are block copolymer silicones.
[6]DC 200, a trade designation of a product of The Dow Corning Company, is a dimethyl siloxane fluid (50 centistoke viscosity).
[7]Mondur PF, a trade designation of a product of The Mobay Chemical Company, is a quasiprepolymer of flaked MDI and dipropylene glycol containing 22.6% free NCO.
[8]D824, a trade designation of a product of The Union Carbide Company, is a quasi prepolymer of toluene diisocyanate and low molecular weight propylene ether glycol.
[9]PAPI and PAPI 901, trade designations of products of The Upjohn Company, are polyphenyl methane polyisocyanates having different MDI contents.

EXAMPLE

A series of runs were made using a Kraus M2FFE1 high pressure injection mixer having an after mixer of the split stream type to mold torus shaped articles using the recipe set forth below on a parts by weight basis:

| | |
|---|---|
| Polypropylene ether triol-ethylene oxide capped of 2000–3000 molecular weight | 89.33 |
| Ethylene glycol | 6.62 |
| Diethanol carbamate | 4.05 |
| Triethylene diamine | 0.30 |
| Tin catalyst of fatty acid type | 0.021 |
| Carbon black | 2.0 |
| Trichloro monofluoromethane | 4.0 |
| Residual water | <0.15 |
| Isonate 226 | 80.0 |

In part of the runs the silicone, Y6691 was added to the quasiprepolymer isocyanate composition at 0.4 part by weight based on the quasiprepolymer and on the other run the silicone Y6691 was added to polyol at 0.75 PBW level. The range of physical properties on torus shaped articles made in these runs are shown in Table 2. These physical values indicates the lowest values obtained when the silicone was added to isocyanate composition was generally as good as or higher than the best values obtained when the silicone was added to the polyol. Also, the cell size was smaller and much more uniform in size and distribution where silicone was added to isocyanate to produce a low surface tension mixture of less than 40 dynes per centimeter and producing a film across the surface tension ring than the foam produced where silicone was added to polyol.

Table 2
Comparison of Properties of Molded Torus Shaped Articles With and Without Silicone in the Isocyanate (Silicone used was ethylene propylene block copolymer available as Y6691)

| Silicone added to | Silicone level (pbw) | SpGr | Tensile (psi) | Elongation (%) | Tear (ppi) |
|---|---|---|---|---|---|
| Polyol | 0.75 | 0.56 | 325–390 | 150–230 | 52–62 |
| Isocyanate Composition | 0.4 | 0.56 | 440–470 | 190–240 | 62–68 |

The above comparison of physical properties shows much less variation in the samples taken at fixed intervals around the torus shaped article and thus shows an improvement in over-all quality of the article molded using an isocyanate composition containing the silicone rather than a polyol containing the silicone. Also, the storage tank containing isocyanate composition containing 0.2 to 0.4 parts of the silicone having ability to yield surface tension less than 40 dynes/centimeter and form a continuous film across the ring are more resistant to crystal formation or variations in isocyanate content at different heights in the tank than the isocyanate composition without the silicone.

The customary polyurethane forming ingredients such as isocyanate compositions, such as liquid MDI, toluene diisocyanate, isomeric mixtures or quasiprepolymers of 1 to 30% free NCO, polyol foaming additives such as water, auxilliary blowing agents, viz. low boiling fluorocarbons, and amine catalyst and/or tin catalyst can be used in this invention. Especially good results are obtained where microcellular, rigid, semi-rigid or flexible foam is made on a high pressure impingement mixer with silicone mixed in isocyanate composition several hours prior to the time foam is made.

While certain representative embodiments and details have been shown for the purpose of illustrating the invention, it will be apparent to those skilled in this art that various changes and modifications may be made therein without departing from the spirit or scope of the invention.

What is claimed is:

1. A storage stable liquid isocyanate composition consisting of a blend of about 0.2 to 0.4 parts of silicone block copolymer of ethylene/propylene with a liquid isocyanate composition that develops crystals on standing for 96 hours at 25° C., said silicone block copolymer having ability at 0.5 parts by weight in 100 parts of said isocyanate composition to reduce surface tension of said isocyanate composition to less than 40 dynes/centimeter as measured by Cenco-DuNony Interfacial Tensiometer at 25° C.

2. The storage stable liquid isocyanate composition of claim 1 exhibiting property of forming a continuous uniform film when surface tension ring was drawn from the liquid surface of said composition.

3. In this method of making polyurethane foams wherein polyurethane forming ingredients comprising isocyanate composition, foaming additives and polyol are mixed, charged to a shaper, and allowed to foam and cure, the improvement comprising adding to a 100 parts by weight of an isocyanate composition about 0.2 to 0.4 parts by weight to form a liquid block copolymer silicone, to form a low surface tension composition of less than 40 dynes/centimeter, mixing the low surface tension composition with the polyol and foaming additives by high pressure impingement of these ingredients into each other.

4. The method of claim 3 wherein the silicone is characterized by ability to yield a low surface tension composition having a surface tension of less than 40 dynes per centimeter when measured at 25° C. on a Cenco-DuNony Interfacial Tensiometer, and said composition contains 0.5 parts of silicone per 100 parts by weight of an isocyanate composition.

5. The method of claim 3 wherein silicone exhibits property of forming a continuous uniform film when surface tension ring was drawn from the liquid surface of said composition.

* * * * *